March 8, 1960  J. A. FRANCIS  2,927,995
FISHING ROD WITH RADIO IN HANDLE
Filed May 3, 1955  2 Sheets-Sheet 1
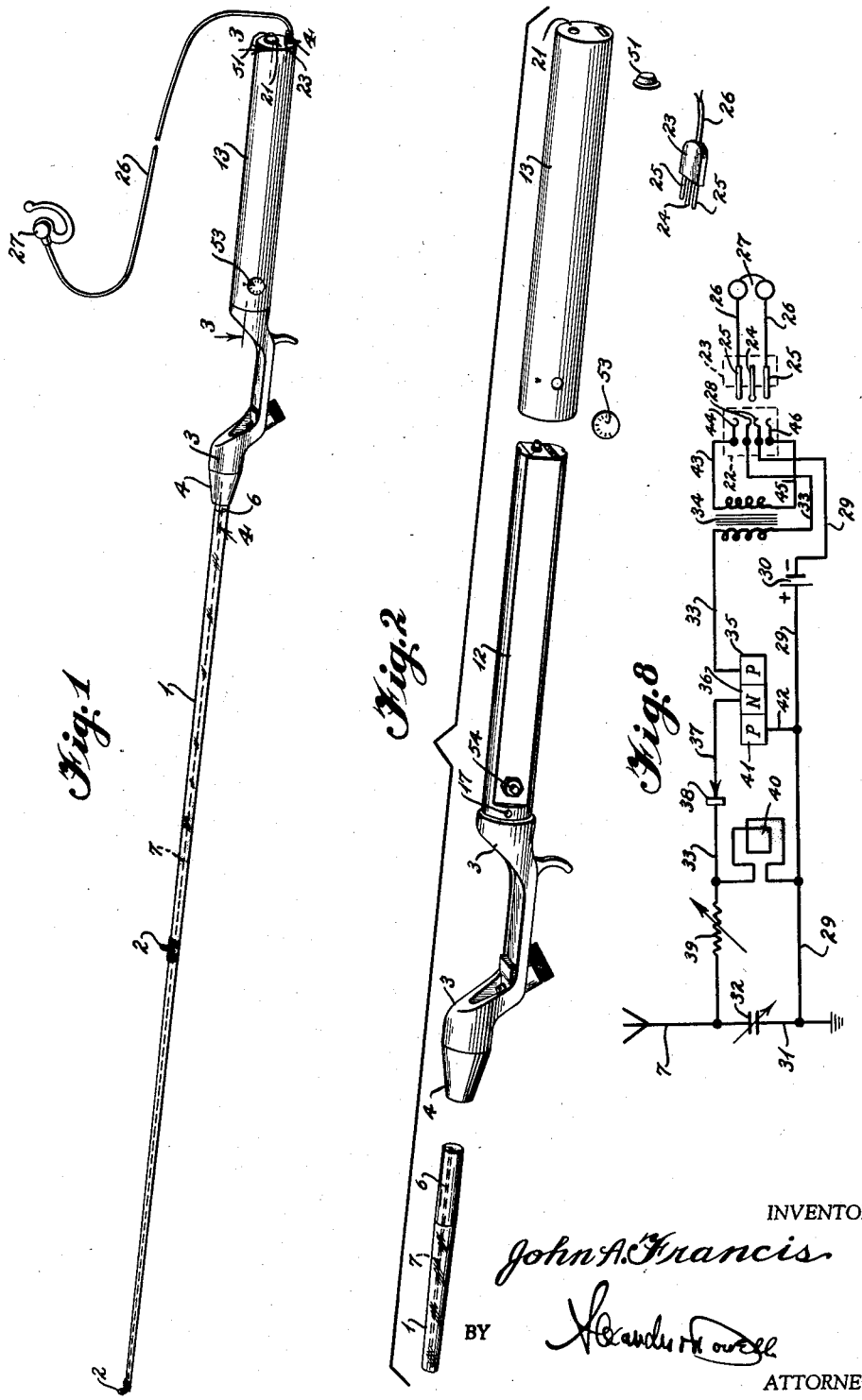
INVENTOR
John A. Francis
BY
ATTORNEYS

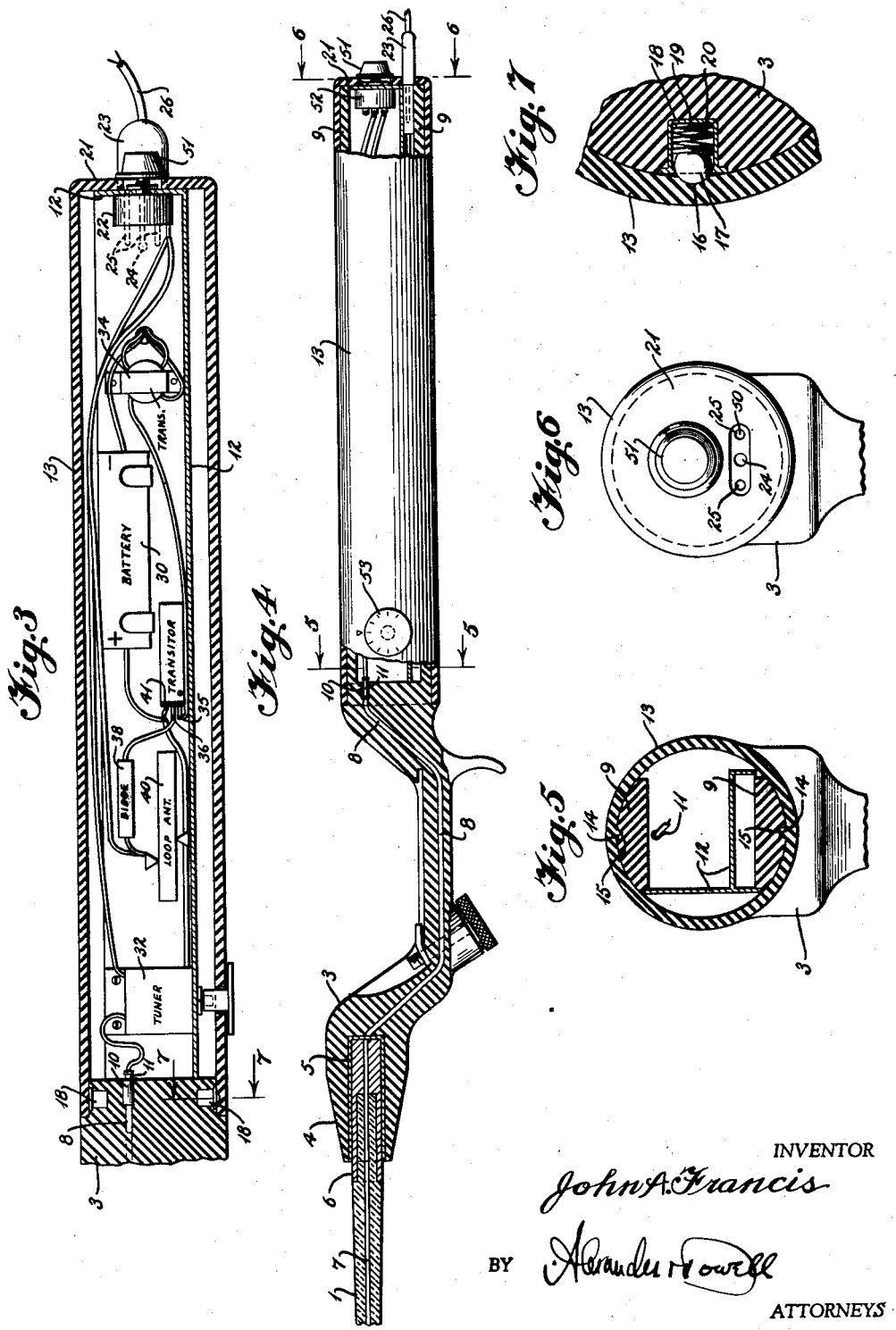

2,927,995

FISHING ROD WITH RADIO IN HANDLE

John A. Francis, Weirton, W. Va.

Application May 3, 1955, Serial No. 505,591

5 Claims. (Cl. 250—14)

This invention is a novel combination fishing rod and radio receiving apparatus, and the principal object thereof is to provide a fishing rod having an antenna in the rod, per se, and a small radio receiving apparatus housed in the handle so that the fisherman can listen to music, broadcast news, or the like while fishing, without disturbing others or the fish.

A further object of the invention is to provide a complete radio receiver exclusive of the antenna and hearing aid or earphones, same being housed in a relatively thin case of such shape and size that it will fit conveniently within the handle and within the hand of the fisherman.

Another object of the invention is to provide a combination fishing rod and radio receiving apparatus which will follow the general lines of an ordinary fishing rod, so that the same may be conveniently carried for use either as a fishing rod, or as a radio receiving apparatus, or both.

A further object of the invention is to provide a combination fishing rod and radio receiving apparatus, so designed that the rod itself serves as the antenna, the antenna giving better reception than small radios which are not provided with antennas, it being found that a small radio ordinarily needs an antenna to give a good reception.

I will explain the invention with reference to the accompanying drawings, which illustrate one practical embodiment thereof, to enable others familiar with the art to adopt and use the same; and will summarize in the claims the novel features of construction, and novel combinations of parts, for which protection is desired.

In said drawings:

Fig. 1 is a perspective view of my combination fishing rod and radio receiver, assembled for use.

Fig. 2 is an expanded view of the parts of the handle, and the adjacent end of the rod, the parts being separated to better illustrate the assembly of parts.

Fig. 3 is an enlarged longitudinal section, on the line 3—3, Fig. 1.

Fig. 4 is an enlarged section, partly in elevation, on the line 4—4, Fig. 1.

Fig. 5 is an enlarged transverse section, on the line 5—5, Fig. 4.

Fig. 6 is an enlarged end view of the handle, on the line 6—6, Fig. 4.

Fig. 7 is an enlarged detail section, on the line 7—7, Fig. 3.

Fig. 8 is a wiring diagram of the radio receiving circuit.

As shown in Fig. 1, the fishing rod consists of a rod 1, carrying the usual eyes 2 for the fishing line, the end of rod 1 being carried by a handle 3, which handle is provided at its outer end with a head 4 provided with a bore 5 receiving the adjacent end of rod 1, a suitable bushing or ferrule 6 being interposed between rod 1 in bore 5, if desired.

The fishing rod 1 may be made of glass, in which case the rod would carry an antenna 7 therein, the inner end of antenna 7 having a conductor 8 extending into the end of the hollow outer portion of the handle 3, for the purpose hereinafter described. If the fishing rod is made of conducting material, however, the rod itself may serve as the antenna, the same engaging the adjacent end of conductor 8 at the base of bore 5.

The outer portion of handle 3 is hollow and carries two integral sector-shaped legs 9 separated at the center of the handle to form a hollow chamber receiving the chassis of the radio receiver, hereinafter described, the legs 9 being preferably parallel and diametrically disposed with respect to the axis of the handle.

At the base of member 3, between the members 9, is a socket 10 of conducting material, which is connected to conductor 8 which extends from the antenna 7, said socket 10 being adapted to receive the lead-in plug 11 of the radio circuit carried by the chassis 12.

Within the handle 3, between the legs 9 thereof, is placed the removable radio chassis 12, making a snug fit therein, said chassis being formed of metal or any other material if necessary and carrying the parts of the radio receiving circuit shown more particularly in Fig. 8, and hereinafter described.

In order to cover or house the chassis 12, I provide a tubular cover 13, open at its inner end and closed at its outer end, said cover being formed of metal or any other material if necessary and having diametrically opposed tongues 14 on its inner walls engaging correspondingly shaped grooves 15 on the outer walls of the legs 9, so as to prevent the cover 13 when applied to the handle from rotating on the handle.

In the inner wall of the cover 13, adjacent the inner end thereof, is a depression 16 adapted to receive a ball 17 housed in a ferrule 18 fitting within a bore 19 in the wall of handle 3; the ball 17 being urged outwardly by a spring 20 to seat the ball 17 in the depression and thereby hold the cover 13 on the handle 3 while permitting the cover to be withdrawn from the handle by an outward pull on the cover in a direction axially of the handle. If desired, an additional spring-pressed ball 17 may be provided in handle 3 opposite from the first mentioned ball, as indicated in Fig. 3, which shows two such balls disposed diametrically opposite each other.

The outer end of cover 13 is closed as at 21. Mounted on the end of chassis 12 adjacent the closed end 21 of cover 13 is a socket 22 for receiving a plug 23 having three prongs, as shown in Fig. 8, the central prong 24 of which is adapted to close the radio receiver circuit, while the two other prongs 25 are connected through conductors 26 with the earphone set 27, or other hearing aid.

In socket 22 carried by chassis 12 is a pair of yieldable contacts 28 adapted to be bridged by the prong 24 when the plug 23 is secured in position on the end of cover 13. One of the contacts 28 is connected by a conductor 29 through a battery 30 to a grounded wire 31, which is connected through a tuning condenser 32 to antenna 7. The other contact 28 is connected by a wire 33 to one end of the primary winding of a transformer 34, the other end of which primary is connected to transistor collector 35, transistor base 36 being connected by conductor 37 through a crystal diode 38 which in turn is connected by conductor 33 through volume control 39, which in turn is connected to antenna 7. Between the conductors 33 and 29 is a loop antenna 40. The transistor emitter 41 is connected by conductor 42 to conductor 29.

The secondary of transformer 34 has one end connected by conductor 43 to a spring contact 44 engaged by one of the prongs 25 of the earphone set, while the opposite end of the secondary of transformer 34 is connected by conductor 45 to spring contact 46 engageable by the other prong 25 of the earphone set, when plug 23 is in operative position.

By the above construction, when plug 23 is in operative position on the fishing rod handle, the radio circuit is automatically closed by the prong 24 and the earphone circuit is closed by spring contacts 44 and 46 engaged with prongs 25.

As shown in Fig. 6, the end 21 of cover 13 is provided with an opening 50, through which the plug 23 may be inserted into the socket 22.

Mounted on the end 21 of cover 13 is a volume control knob 51, which actuates the volume control 39 through suitable means housed in block 52 mounted on the outer end of chassis 12.

On the side of the cover 13 adjacent the front end thereof is a variable condenser or tuner knob 53, which operates through suitable mechanism the tuning condenser 32, the knob being removable when the cover 13 is to be withdrawn from the handle 3, the knob fitting upon a shaft 54 controlling the position of tuning condenser 32.

By the above construction, when plug 23 is engaged with socket 22, the electric circuit of the radio receiver is automatically closed, and the earphones 27 connected in the circuit. When the plug 23 is withdrawn from socket 22, the circuit of the radio receiver is automatically opened.

The parts may be readily disassembled or assembled for replacements, repairs, etc., when desired.

My invention provides a fishing rod handle which is hollow to receive a small completely housed radio therein, operated by battery or by a germanium diode. The entire radio circuit may be conveniently housed in cover 13 which may be of no larger size than approximately 1¼ inches in diameter and 8 inches long. The size of the handle may, of course, be varied, but should not be so large as to be uncomfortable for the fisherman to hold.

According to my invention, the fishing rod 1 may be of length, such as 70 inches, which is ample to provide an adequate antenna 7 which will give good reception; and, of course, the fishing rod 1 itself may form the antenna or, where made of glass, the rod may house the antenna wire 7.

I do not limit my invention to the exact form shown in the drawings, for obviously changes may be made therein within the scope of the claims.

I claim:

1. In combination with a fishing rod having a hollow handle, a radio receiver housed within said hollow handle; said rod includnig a radio antenna; said radio receiver including a chassis removably inserted in said handle and carrying an open electric circuit connecting all parts of the radio receiver except earphones; means electrically connecting the antenna in said open circuit when the chassis is disposed in said hollow handle; said chassis including a socket block having normally open contacts disposed in said circuit accessible exteriorly of the handle; and a plug adapted to engage the socket block having prongs connecting said earphones and having a further prong adapted to engage the first mentioned contacts to close said circuit when the plug is engaged with said socket block.

2. In a combination as set forth in claim 1, said rod being formed of glass, and said antenna including a conductor rod extending therethrough; and said connecting means including a conductor extending between the conductor rod and a quick detachable connector in the said radio circuit.

3. In a combination as set forth in claim 1, said handle including spaced opposed sector-shaped legs receiving therebetween said radio chassis; said legs having axial grooves in their outer faces; a cover slidably fitting over said legs and having ribs on its inner wall fitting in said grooves to prevent the cover from rotating on said legs.

4. In a combination as set forth in claim 3, spring pressed means on the handle engaging depressions in the cover for yieldably maintaining the cover against axial movement on said legs.

5. In a combination as set forth in claim 3, said cover having a closed outer end provided with an opening through which said plug may be engaged with the socket block, said cover carrying a volume control knob, and a condenser tuning knob operating the related parts of the radio receiver.

References Cited in the file of this patent

UNITED STATES PATENTS

| 2,074,887 | Beshore | Mar. 23, 1937 |
| 2,101,033 | Mashbir et al. | Dec. 7, 1937 |
| 2,175,025 | Hooven | Oct. 3, 1939 |
| 2,487,601 | Schncor et al. | Nov. 8, 1949 |
| 2,810,068 | Weisz et al. | Oct. 15, 1957 |

FOREIGN PATENTS

| 229,356 | Great Britain | Feb. 20, 1925 |
| 714,125 | France | Aug. 31, 1931 |

OTHER REFERENCES

"Sports Radio is Combination Kane and Seat," Popular Science, March 1940, pp. 214–215.

"Football Fan's Radio," Popular Science, December 1938, pp. 220–222.

"Vagabond," Wireless Microphone System, Tele-Tech., March 1954, pp. 86–88.

"Are You Ready for Conelrad," Radio & Television News, April 1955, p. 69.

"How to Build a Pocket Sportset," Radio News, October 1937, pp. 202–203.